Jan. 26, 1965   M. M. ALLISBAUGH ETAL   3,166,940
PIPETTE
Filed March 23, 1961   3 Sheets-Sheet 1
Fig. 1.   Fig. 2.   Fig. 3.
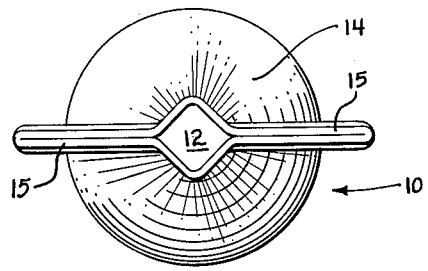
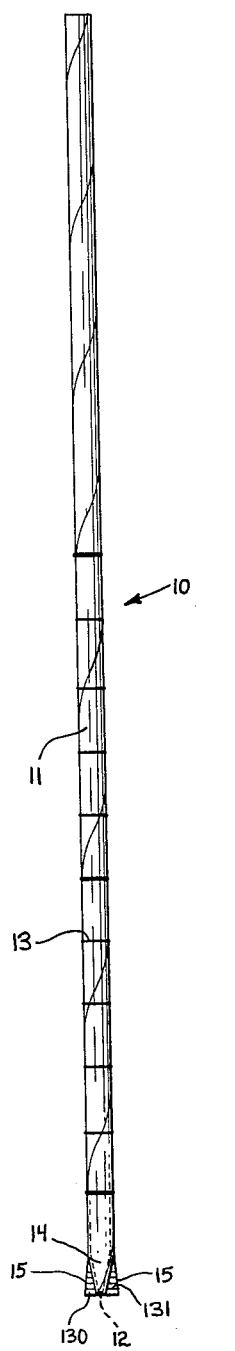
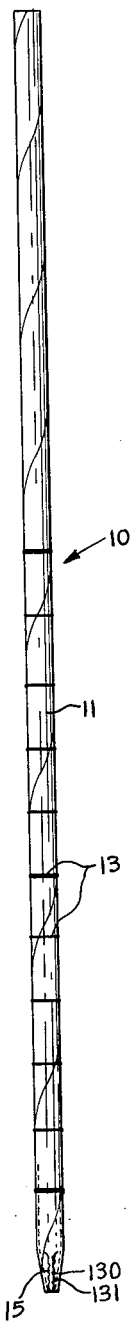
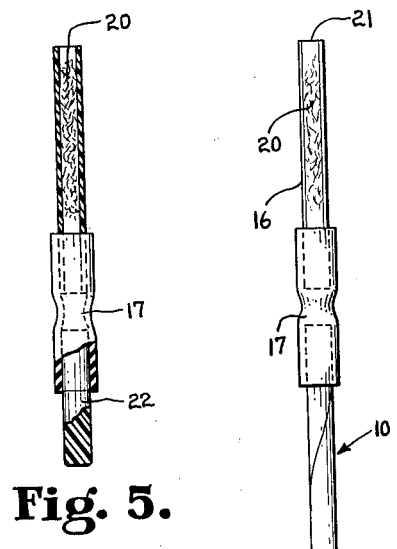
Fig. 5.
Fig. 4.
INVENTOR.
MARJORIE M. ALLISBAUGH
BY & JOHN H. ALLISBAUGH
*Lockwood, Woodard, Smith & Weikart*
Attorneys INVENTOR.
MARJORIE M. ALLISBAUGH
& JOHN H. ALLISBAUGH
BY
Lockwood, Woodard, Smith & Weikart
Attorneys Jan. 26, 1965     M. M. ALLISBAUGH ETAL     3,166,940
PIPETTE
Filed March 23, 1961     3 Sheets-Sheet 3

INVENTOR.
MARJORIE M. ALLISBAUGH
BY & JOHN H. ALLISBAUGH
Lockwood, Woodard, Smith & Weikart
Attorneys United States Patent Office 3,166,940
Patented Jan. 26, 1965

3,166,940
PIPETTE
Marjorie M. Allisbaugh and John H. Allisbaugh, both of 6308 Breamore Road, Indianapolis, Ind.
Filed Mar. 23, 1961, Ser. No. 97,922
4 Claims. (Cl. 73—425.4)

The present invention relates to pipettes.

Pipettes are well known devices used in serological, biological and chemical laboratories for adding, removing or transferring relatively small quantities of fluid from one container to another. Most pipettes are provided with a constricted bore at the lower end thereof which permits retention of fluid without leaking by placing the finger on the upper end of the pipette and also permits greater accuracy since the fluid travels more slowly between calibration marks while passing out of the pipette through the restricted bore.

At least partly because of the difficulty of maintaining the internal diameter constant, glass pipettes are relatively expensive. Variation of the internal diameter of a glass pipette makes necessary individual calibration of such pipettes. Even with such individual calibration, the only accuracy that can be relied upon is of total delivery and not of the difference in volume between a given pair of calibrations. Because of the relatively great cost of such pipettes, it is necessary to use such pipettes again and again which requires repeated washings and sterilizations.

Consequently, one object of the present invention is to provide an improved pipette.

Another object of the present invention is to provide a pipette which is more easily mass produced than conventional pipettes.

A further object of the present invention is to provide a pipette which is so inexpensive that it can be disposed of after a single use.

Still another object of the present invention is to provide a pipette which is accurate as to volume between calibrations as well as to total delivery.

One embodiment of the present invention might comprise a tube formed of a thin, flexible strip of transparent cellulose plastic, helically wrapped to a uniform diameter and having one end deformed to provide a reduced diameter opening therethrough.

Referring to the U.S. Patent to Cohn, 2,376,231, there is disclosed a forerunner to the present invention which makes use of a cellulose plastic or cellulose hydroxide (commonly known as cellophane) drinking tube or straw as a part of a pipette. As is pointed out in this patent, the cellophane drinking tube is to some extent yieldable. Increased rigidity can be supplied by heating the tube and alternatively, the flexibility of the tube is not critical if the tube is grasped at a portion that is not containing the liquid. Even so, this yieldability or flexibility of cellophane is to some extent, a problem. It is standard practice in many laboratories when using pipettes to plug the larger end portion of the pipette with cotton in order that communication of germs, virus and the like is prevented between the larger open end of the pipette (upon which the mouth is placed in order to suck liquids into the pipette) and the liquid containing portions of the pipette. Each time a glass pipette is washed and sterilized, it is necessary to replace this cotton plug.

For the above reasons, it is a further object of the present invention to provide an improved pipette arrangement which makes unnecessary frequent replacing of a cotton plug within the larger end of a pipette.

Another object of the present invention is to provide a novel pipette arrangement incorporating a disposable and a permanent portion.

Still another object of the present invention is to provide an improved pipette arrangement eliminating one of the major objections to the use of cellophane pipettes, that being the flexibility or yieldability of the cellophane.

Still a further object of the present invention is to provide a disposable pipette which can be packaged in groups and sterilized in a hot air oven to provide freedom from bacteria and virus.

Related objects and advantages will become apparent as the description proceeds.

The full nature of the invention will be understood from the accompanying drawings and the following description and claims.

FIG. 1 is a front elevation of a pipette constructed according to the present invention.

FIG. 2 is a side elevation of the pipette of FIG. 1.

FIG. 3 is an enlarged bottom view of the pipette of FIGS. 1 and 2.

FIG. 4 is a fragmentary view of a pipette arrangement including as a portion thereof, the pipette of FIGS. 1–3.

FIG. 5 is a view of structure similar to FIG. 4 but showing a preliminary step in the manufacture and use of the structure of FIG. 4.

Figure 6:
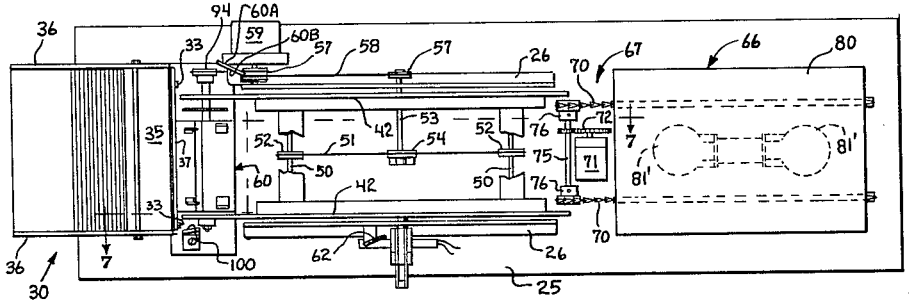
FIG. 6 is a top plan view of apparatus for use in the manufacture of the pipette of FIGS. 1–5.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a pipette 10 which is manufactured from the well known transparent cellulose plastic (cellophane) drinking tube or straw. This tube 11 is formed in standard fashion by wrapping a relatively narrow strip of cellophane having uniform thickness helically around a mandrel of uniform diameter all along its length. Simultaneously with such wrapping, the edges of the strips are caused to adhere to adjacent edges by the application of heat. Because of the fact that the mandrel has a uniform diameter, the internal cavity of the tube will also have a constant and uniform internal diameter all along its length.

The cellophane tube 10 is deformed to provide a restricted or reduced conical opening 12 at one end. This deformation is accomplished by a crushing and pinching action described in detail below and includes the application of heat and pressure to form oppositely projecting wings 15 which aid in providing rigidity to the lower end portion of the tube 11 and have uniform hills and valleys or ridges therealong extending outwardly of the conical portion 14. Formed upon the outer surface of the tube 10 is a plurality of annular spaced calibrations 13. These calibrations consist of a paint or ink such as, for example, butrate model airplane dope (acetone base) which is formed upon the outside of each pipette as a plurality of thin lines perpendicular to the axis of the tube and located at predetermined equally spaced intervals. It has been found that the "hot fuel proof" variety of this butrate dope does have a somewhat better action than the standard variety.

Because of the uniform diameter bore through the cellophane tube, exceptional accuracy of delivery of the total contents of the pipette as well as accurate delivery of the contents of each subdivision (volume between respective calibrations) is achieved with equally spaced calibrations. Obviously, equally spaced calibrations are much more easily applied than the individual calibrations necessary to glass pipettes and an apparatus for application of such equally spaced calibrations is described in detail below. If desired, even numbered calibrations or every fifth calibration may be somewhat thicker than the remaining calibrations in order to facilitate use of the pipette.

Referring to FIGS. 4 and 5, the pipette 10 is shown connected to a hollow glass tube 16 by means of a flexible length of rubber tubing 17. The hollow glass tube 16 has received therein a cotton plug 20, the purpose of which is to prevent communication of bacteria, virus and the like between the open end 21 of the glass tube and the interior or contents of the pipette 10. It should be noted that the assembly consisting of the glass tube 16, the flexible rubber tubing 17 and the cotton plug 20 can be used many times over without repeated sterilization and with many disposable pipettes 10. This can be accomplished by protecting the open end of the rubber tube from contamination by the use of standard bacteriological aseptic technique and by also insuring that the newly inserted pipette 10 is in sterile condition at the time of insertion.

It is, of course, necessary to sterilize the assembly consisting of the cotton 20, flexible tube 17 and glass tubing 16 initially and upon certain occasions, for example, when the disposable tube 10 is used for a different virus or chemical. In order to prevent the shrinkage or deformation of the rubber 17 as a result of the sterilizing operation, a short length of solid glass material 22 having the same outer diameter as the pipettes 10 is inserted into the pipette end portion of the rubber tubing. Any tendency of the rubber to shrink and deform during sterilization is thus resisted by the glass 22.

It will be evident that, even though the pipettes 10 are formed of somewhat yieldable material, a perfect non-leaking fit is provided between the pipette and the flexible rubber tubing 17. Furthermore, since the glass 22 is formed of solid material, it acts as an obstruction to the passage of bacteria and the like into the rubber tubing before and between the insertion of the various pipettes 10. It can also be appreciated that there is no necessity of changing the cotton 20 each time that the structure of FIG. 5 is sterilized as is necessary when using a glass pipette with a cotton insert.

In order to facilitate insertion of the glass tube 22 in the rubber tubing 17 and particularly of the pipette 10 into the rubber tubing, the rubber tube should be moistened lightly with an antiseptic solution such as five percent phenol of 1:1000 bichloride of mercury whereby the rubber will be lubricated and will slip easily and tightly over the open end of the pipette.

It should be noted that, as an alternative to the cellulose hydroxide or cellophane described above, a laminated transparent plastic might be used in making the pipette. It has been found that certain materials such as polyethylene are resistant to the absorption of virus. Thus, for certain applications, the advantages of using laminated plastic (perhaps polyethylene laminated with cellophane) will be evident.

Referring now to FIGS. 6–12, there is disclosed an apparatus for manufacturing the pipettes described above. This apparatus includes a base plate 25 having a pair of parallel racks 26 fixed thereto and extending upwardly therefrom. Each of the parallel racks 26 has a plurality of equally spaced notches 27 formed in the upper edge of the respective rack. Each notch 27 in one of the racks 26 is directly opposite to an identical notch in the other rack 26.

Figure 7:
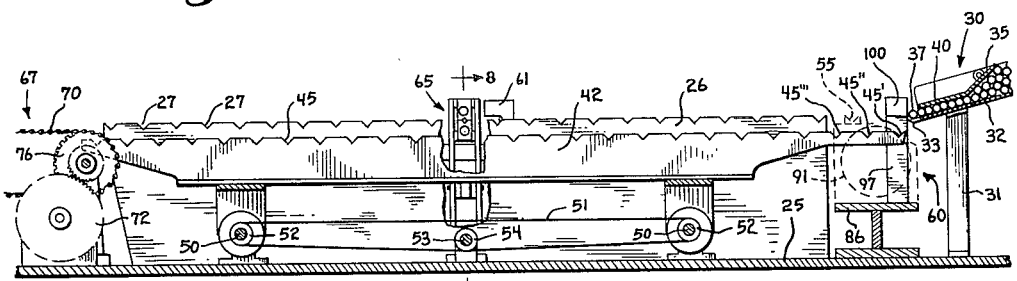
FIG. 7 is a side elevation of the structure of FIG. 6 taken partly in section along the line 7—7 of FIG. 6.

Fixed to one end of the base plate 25 is a feeding station 30 which is illustrated in section in FIG. 7. The feeding station comprises a support 31 and a lower element 32 which slopes downwardly toward the remainder of the device to the right as viewed in FIG. 6 and to the left as viewed in FIG. 7. The lower element 32 has two upturned lips 33—33 at its lower end which prevent the cellophane tubes 37 from falling out of the feeding station. The feeding station further includes a pair of spaced side plates 36 which are fixed to the lower element 32 and function to position the cellophane tubes. An upper element 35 is adjustably mounted between the side plates 36 and has a lower portion 40 which is spaced from the lower element 32 a distance slightly greater than the diameter of the particular cellophane tubes being used as raw material.

The extending lips 33 of the lower element 32 permit the notches 45' to engage the tube 37 retained therein for removal from the feeding station. These movable racks 42 have, similarly to the racks 26, a plurality of notches 45 which are spaced apart an equal distance to the spacing of the notches 27. The parallel racks 42 are both mounted upon a downwardly opening channel 46 which is, in turn, mounted at its four corners upon four wheels 47 which are secured to the opposite ends of a pair of shafts 50. It should be mentioned that the mounting of the channel upon the wheels 47 is eccentric and pivotal, the pivotal mounting upon each wheel being located an equal distance from the axis of the wheel and in the same phase on each wheel. Thus, as the shafts 50 are rotated, the channel 46 and the racks 42 remain horizontal but move through a circular path wherein the notches 45 move upwardly past a particular notch 27 and move downwardly past the next adjacent notch 27, thus stepping the cellophane tubes along the rack 26.

Figure 9:
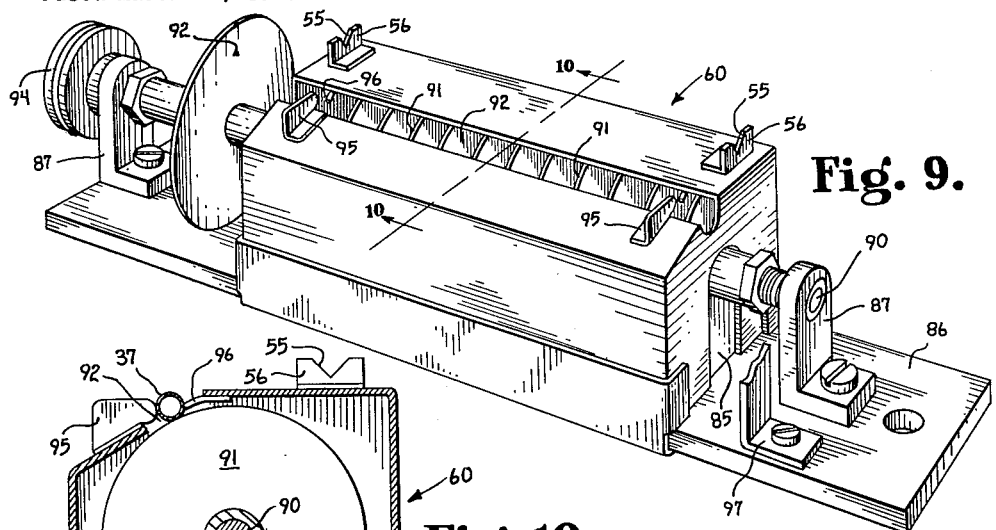
FIG. 9 is a perspective view showing the calibrating portion of the device of the structure illustrated in FIGS. 6 and 7.
Figure 10:
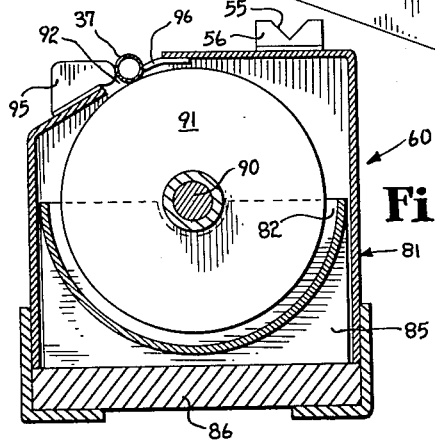
FIG. 10 is a vertical section taken in the direction of the arrows and along the line 10—10 of FIG. 9.
Figure 12:
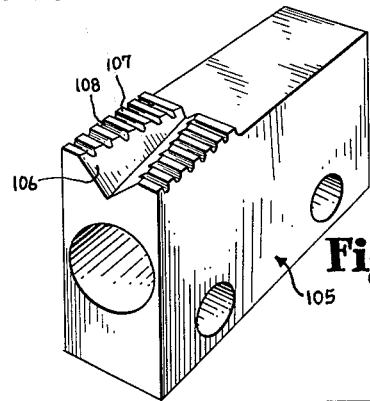
FIG. 12 is a detail perspective view of a representative one of a pair of jaws forming a part of the structure illustrated in FIG. 11.

The notches 45' of racks 42 (just adjacent the feeding station 30) are so positioned as to move past the lips 33 on the lower element 32 of the feeding station to pick up the lowermost straw 37 and to deposit it in the calibrating device illustrated in detail in FIGS. 9 and 10. The notches 45" just adjacent to the most endward notches are so positioned as to lift said straw from the operating portion of the calibrating device and to deposit it in a set of notches 55 formed in elements 56 fixed to the top of the calibrating device. The set of notches 45''' of the rack 26 next to notches 45'' next lifts the straw from the supporting elements 56 and drops it upon the stationary rack 26 for further leftward motion as viewed in FIG. 7. It should be understood that as the racks 42 rotate, the straws or tubes are moved and are stationary at intervals, thus permitting operations to be carried out upon the straws between movements and while they are stationary.

The shafts 50 are rotated by means of a belt 51 which is received about suitable pulleys 52 fixed to the shafts 50. The belt 51 is driven by a pulley 54 received upon a shaft 53 which is driven through pulleys 57 and belt 58 from a suitable motor 59 mounted upon the base plate 25. It can be appreciated that the various shafts 50 and 53 are provided with suitable bearing assemblies 57' which mount the shafts upon the base plate 25.

After a particular tube or straw has been calibrated by the calibrating apparatus 60, it is stepped to the elements 56 thence along the stationary rack 26. As the straw moves to the rack 26, it is displaced axially by the guide 60A and particularly by the guides sloping face 60B. The straw continues down the rack 26 until it reaches a guide 61 fixed to the stationary rack 26. This guide has a sloping face 62 which tends to push the straw rightwardly as viewed in FIG. 8 until it is at a suitable position for crushing by the forming dies 65. The forming dies produce the reduced orifice 12 in one end of the tube as explained above and illustrated in FIGS. 1–3. After the crushing of the one end of the tube, each tube is stepped further down the length of the stationary racks 26 until the tube reaches the drying station 66.

The drying station 66 comprises a conveyor 67 including a pair of belts 70 driven by a motor 71 through gears 72, shaft 75 and pulleys 76. This conveyor arangement moves the straws from the most leftward notch 27 as viewed in FIG. 7 through a container 80 which is fixed in position surrounding the conveyor belts 70 and has a pair of electric light bulbs 81' located therein in order to provide heat for drying the calibrations on the tubes. After drying at the drying station, the pipettes are in finished form and can be used either with the structure illustrated in FIG. 4 or without such structure in conventional manner.

Referring more particularly to FIGS. 9 and 10, the details of the calibrating apparatus are shown. This apparatus comprises a housing 81 which is secured to the base plate 25 and has fixed therein a tank 82 having a semi-cylindrical shape and receiving the above described dope for the calibration of the straws. The ends of the tank 82 are formed by upright elements 85 which are fixed to a horizontal plate 86 making up a portion of the housing 81. Rotatably mounted to the horizontal plate 86 by means of suitable bearing housings 87 is a horizontal shaft 90 upon which are mounted a plurality of equally spaced discs 91.

In operation, these discs are partly submerged within the ink or paint (dope) in the tank 82 and thus, rotation of these discs results in their outer peripheries having a coating of the marking material thereon. The housing 81 has formed in its upper surface an elongated opening 92 adapted to receive the straws from notches 45' after they have been picked up from the feeding station. Secured to the upper surface of the housing is a pair of guides 95 which, along with guides 96 secured to the underneath surface of the uppermost portion of the housing, insure that the tube or straw is properly positioned for marking. There is also secured to the base plate 86 a guide 97 having a sloping surface 100 (FIG. 6) which cooperates with the movable rack 42 to bring the straw or tube into exactly the correct position for calibration by the discs 91.

If desired, every other one of the discs, for example, or conceivably, every fifth one of the discs may have a thicker outer periphery than the remaining discs in order to facilitate the reading of the resulting calibrations. It will be clear from the above description that the rotation of the discs 91 produces a rotation of each of the tubes 37 thus causing an annular marking completely around the tube to be formed at spaced locations therealong. After such marking, the notches 45'' and 45''' of the movable rack 42 remove the straw from the calibrating device as above described. A disc 92 which is identical in diameter to the discs 91 is mounted on the shaft 90 outside of the tank 82 in order to support the straws while they are being calibrated. (It can be appreciated that only the lower portion of the pipette in the usual situation need be calibrated.)

It should be mentioned that the shaft 90 is rotated by the motor 59 or any suitable motor through the pulley 94.

Figure 8:
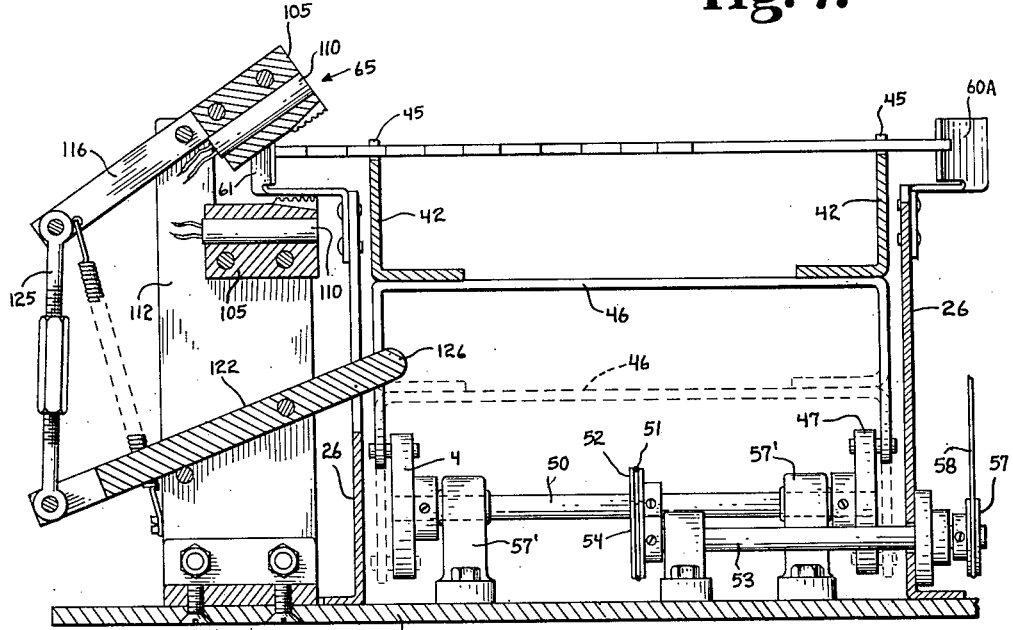
FIG. 8 is a vertical section taken along the line 8—8 in the direction of the arrows.
Figure 11:
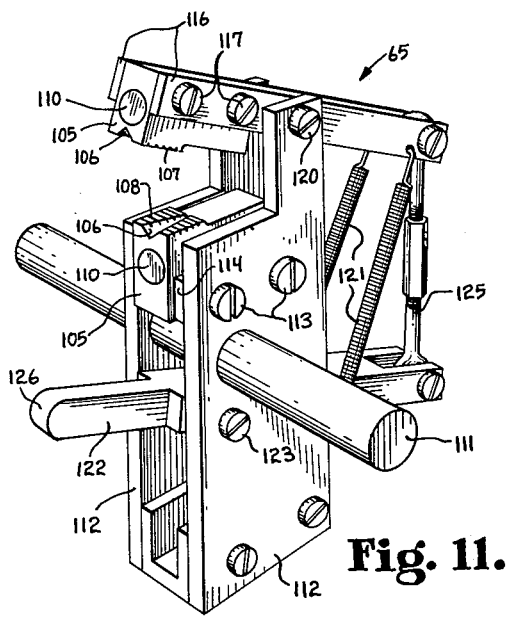
FIG. 11 is a perspective view of a portion of the structure appearing in FIGS. 6–8.

Referring particularly to FIGS. 8 and 11, the set of dies 65 for forming the end of the pipette is illustrated in detail and includes a pair of jaws 105 having tapered ridges 106 in the cooperating faces thereof. On opposite sides of these tapered ridges, there is formed a plurality of hills and valleys or ridges and indentations 107 and 108, respectively, the surfaces 107 and 108 being complementary so that, when the jaws 105 come together, the ridges of the surface 107 fit into the indentations of the surface 108 and vice versa. Each of the jaws 105 is provided with a heating element 110 which serves to raise the temperature of the jaw to a sufficient degree that the deformation of the cellophane caused by the jaws is permanent.

The temperature of the jaws necessary to produce a permanent deformation is variable and should be determined by experimentation, it being understood that the jaws should not be at so great a temperature as to cause burning or discoloration of the cellophane but should be at a sufficiently great temperature to produce a permanent deformation of the cellophane into the shape illustrated in FIGS. 1–3. For the illustrated embodiment, it has been found that a temperature of 250° to 300° F. of the jaws is appropriate. A suitable thermostat 111 is mounted within upright plates 112 as close to the jaws as is convenient in order to sense the temperature thereof and control the current flow to the heating elements 110 in conventional manner.

The lowermost jaw 105 is stationary and is fixed in position between the uprights 112 by suitable screws 113 and spacing elements 114 (one shown). The uppermost jaw 105 is fixedly mounted between bars 116 by means of screws 117. The bars 116 are pivoted upon the upright 112 by means of pin 120 and are maintained in a downwardly pivoted position with the jaw open by means of springs 121 secured at one end to the bars 116 and at the opposite end to the upright 112.

A lever 122 is pivoted by element 123 to the uprights and is connected to the bars 116 by means of connecting rod 125 pivotally secured at its opposite ends to the bars 116 and the lever 122. The projecting end 126 of the lever 122 is positioned beneath the horizontal portion of the channel 46. Each time the channel 46 moves to its lowermost position as indicated in dotted lines of FIG. 8, the lever 122 and particularly its extending end 126, is moved downwardly causing the jaws 105 to clamp together and to crush the end of the straw into the configuration shown in FIGS. 1–3, a pinching action being used to provide the oppositely projecting wings 15. It should be noted that the hills and valleys or protuberances and recesses of the surfaces 107 and 108 form corresponding raised portions and depressed portions 130 and 131 in the end of the tube 11, said raised and depressed portions cooperating with the heat of the jaws to firmly integrate the oppositely extending projections 15 and to provide rigidity to those oppositely projecting portions and to the lower end of the pipette. The configuration of a representative one of the jaws 105 is shown in detail in FIG. 12.

Figure 13:
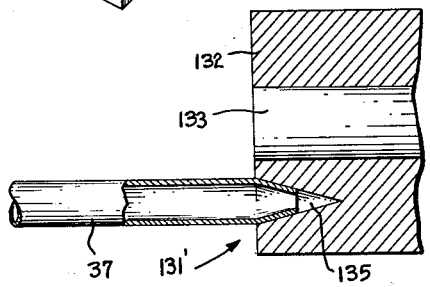
FIG. 13 is a section of an alternative embodiment of the present invention.

Referring to FIG. 13, an alternative embodiment of the invention is illustrated which comprises a forming die 131' having a heating element 132 received therein, said heating element being controlled in a similar manner to the above described heating elements 110 to heat the die 131' to a temperature suitable for maintaining deformation of the cellophane but not sufficient to burn or discolor the cellophane. Formed within the die 131' is a conically shaped indentation 135. In order to use the device of FIG. 13, the tube 37 is inserted into the indentation 135 causing the end of the tube to assume the conical shape of the indentation and to reduce the opening at the end of the tube a desired amount depending upon the distance that the tube is inserted into the indentation. The tube of FIG. 13 can then be marked or calibrated in a similar fashion as above described.

From the above description, it can be appreciated that the present invention provides an improved pipette and one which is so inexpensive that it can be disposed of after a single use. It can also be appreciated that because of the constant internal diameter of the pipette, accuracy is provided as to volume between calibrations as well as to total delivery. It can also be seen that the present invention provides a pipette which is more easily mass produced then conventional pipettes at least partly because of the fact that the calibrations can be spaced at uniform intervals. The above description should also serve to point out that the present invention provides an improved method and apparatus for forming pipettes.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A pipette comprising a tube composed of a thin flexible strip of a transparent cellulose plastic material helically wrapped to a uniform diameter, said tube having one end integral with the tube and formed of said material, said material being deformed at said one end to provide a reduced diameter opening therethrough.

2. A pipette comprising a tube composed of a thin flexible strip of transparent cellulose hydroxide helically wrapped to a uniform diameter, said tube being crushed at one end to form an open-ended generally conical shape having sidewardly and oppositely projecting wings having reenforcing ridges therein extending away from the conical shape, and calibrations located directly on the tube.

3. A pipette comprising a tube composed of a thin flexible strip of transparent cellulose hydroxide helically wrapped to a uniform diameter, said tube being crushed at one end to form an open ended generally conical shape having sidewardly and oppositely projecting wings, calibrations located directly on the tube, a glass tube, a cotton plug inserted in said glass tube, and a flexible rubber-like tube connecting said glass and cellulose hydroxide tubes.

4. A pipette comprising a tube composed of a thin flexible strip of transparent cellulose hydroxide material helically wrapped to a uniform diameter, said tube and material being formed at one end into an open-ended generally conical shape tapering from said portion of uniform diameter and in which the open end is of a size smaller than the size of said tube at said uniform diameter, and calibrations located directly on the tube.

References Cited in the file of this patent

UNITED STATES PATENTS

| | | |
|---|---|---|
| 1,858,366 | Lehmann et al. | May 17, 1932 |
| 2,348,831 | Mathis | May 16, 1944 |
| 2,376,231 | Cohn | May 15, 1945 |
| 2,656,944 | Swett | Oct. 27, 1953 |
| 2,667,074 | Whitehill | Jan. 26, 1954 |
| 2,680,471 | Mercer | June 8, 1954 |
| 2,908,601 | Brown | Oct. 13, 1959 |